(12) United States Patent
Hancock et al.

(10) Patent No.: US 9,079,539 B2
(45) Date of Patent: Jul. 14, 2015

(54) PIPE MOUNTABLE MIRROR WITH BRACKET

(71) Applicants: Jeffrey D. Hancock, Uintah, UT (US); Christopher N. Schenck, Uintah, UT (US)

(72) Inventors: Jeffrey D. Hancock, Uintah, UT (US); Christopher N. Schenck, Uintah, UT (US)

( * ) Notice: Subject to any disclaimer, the term of this patent is extended or adjusted under 35 U.S.C. 154(b) by 0 days.

(21) Appl. No.: 13/694,009

(22) Filed: Oct. 18, 2012

(65) Prior Publication Data

US 2014/0153123 A1 Jun. 5, 2014

(51) Int. Cl.
*G02B 7/182* (2006.01)
*B60R 1/06* (2006.01)

(52) U.S. Cl.
CPC .................................... *B60R 1/06* (2013.01)

(58) Field of Classification Search
CPC ........ B60R 1/06; B60R 1/0605; B60R 1/064; B60R 1/078
USPC .................................. 359/841, 871, 872, 879
See application file for complete search history.

(56) References Cited

U.S. PATENT DOCUMENTS 6,007,198 A * 12/1999 Burton ............................ 351/50
6,239,926 B1 * 5/2001 De Shazer .................... 359/841

* cited by examiner

*Primary Examiner* — Euncha Cherry

(57) ABSTRACT

A pipe mountable mirror with bracket has a pipe mounting member with semi-circular surface to engage and to be clamped to an upright support or overhead, horizontal structural member and that has a projecting arm supporting a cylindrical base with a bore therethrough and a non-rotating ring of teeth surrounding the base; a mirror support arm having one end pivotable around the base, and a bore therethrough aligned with the bore through the base, and a ring of teeth that mesh with the teeth surrounding the base and a coiled spring acting to bias the ring of teeth rotable with the arm into meshing engagement with the non-rotable ring of teeth and being adjustable held in mesh by a bolt inserted through the spring and threaded into a nut secured in the cylindrical base, and a threaded shaft projecting from the other end of the mirror arm, a locking nut threaded onto the shaft and an attachment member fixed to a mirror and turned onto the threaded shaft.

11 Claims, 8 Drawing Sheets

Figure 1:
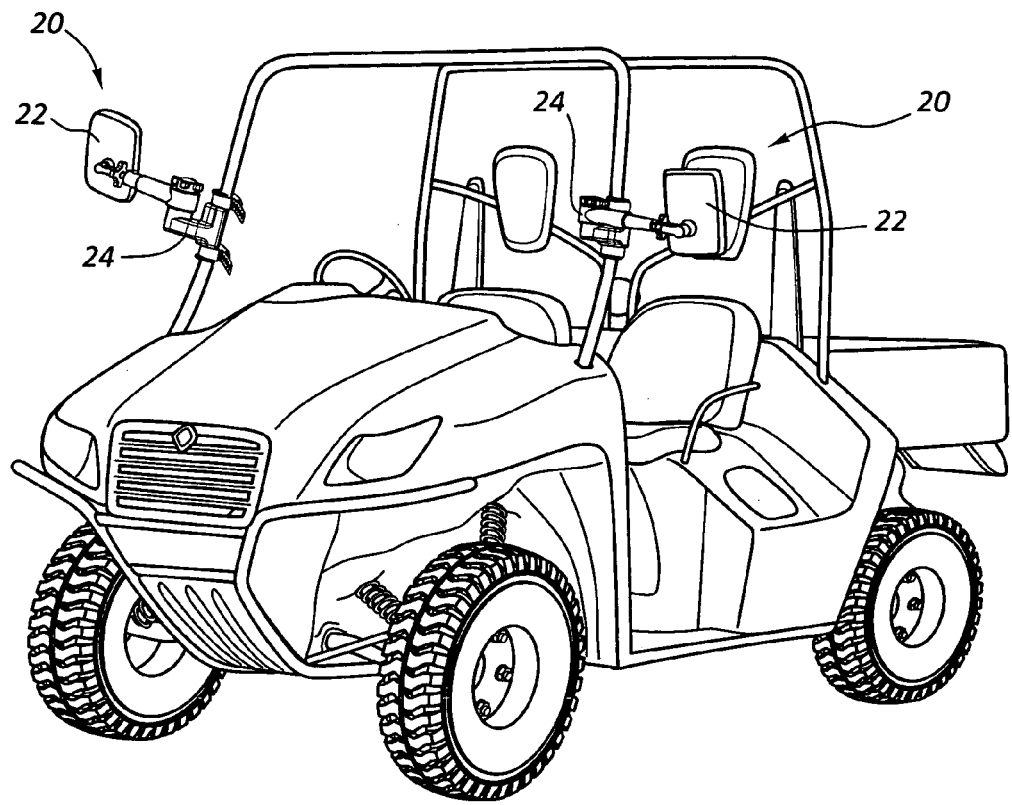

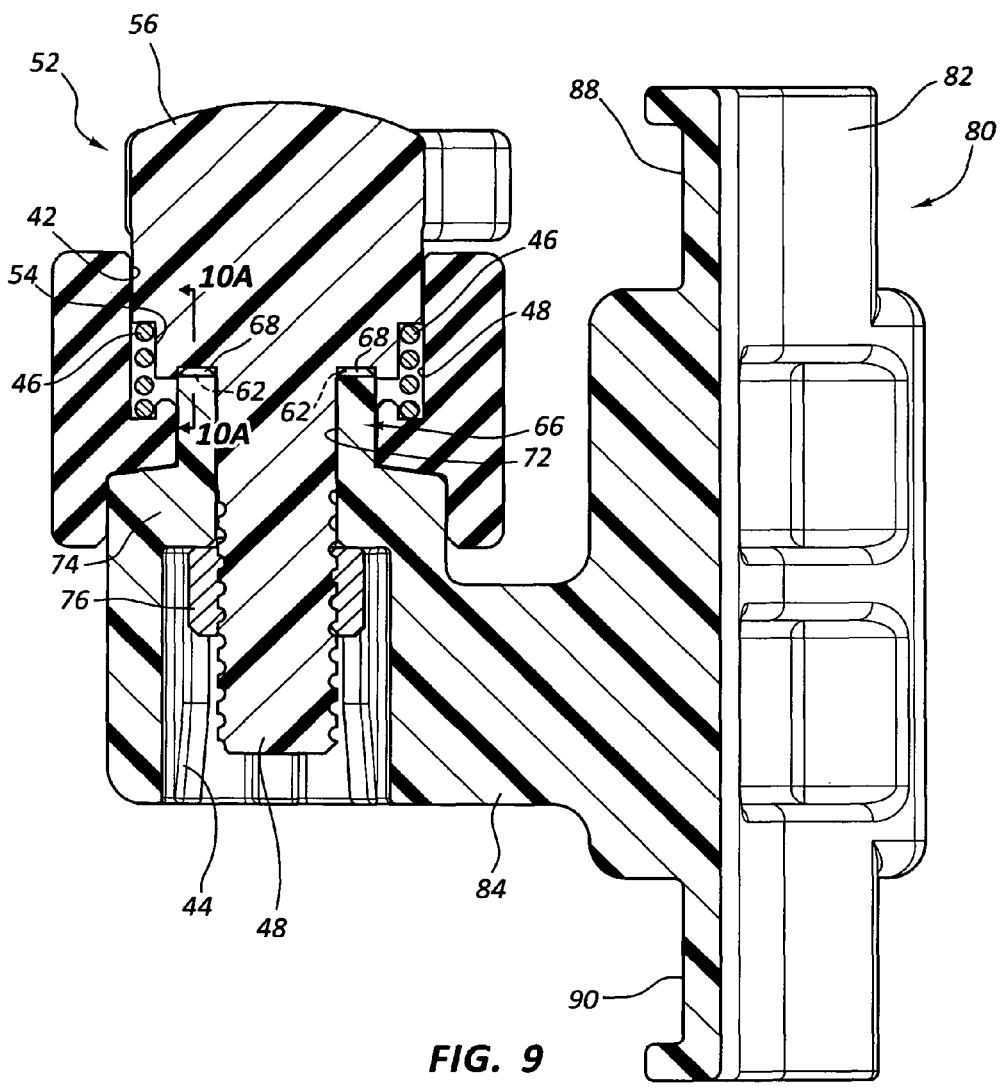
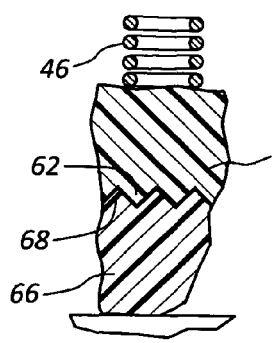
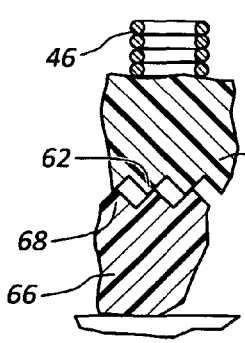
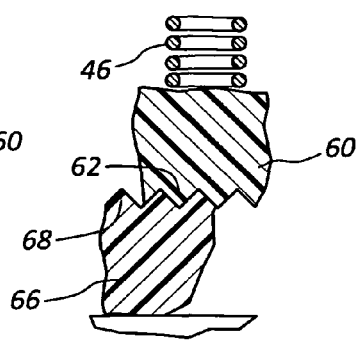
FIG. 9
FIG. 10A     FIG. 10B     FIG. 10C

PIPE MOUNTABLE MIRROR WITH BRACKET

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

Field of the Invention

This invention relates to mirrors and mounting structures for securing such mirrors, and the like, to pipes or tubing serving as support columns for towers and/or overhead frames, and to the frames themselves that are mounted on all-terrain and water vehicles. The towers and/or overhead frames are intended to support articles, i.e., lights, canopies, guns, camp gear, skis, snowboards, water skis, wake boards, water boards, fishing poles and tackle, for example, and many other articles as well. They are also used to provide attachment structures for tow ropes interconnecting other water craft and people on them to boats. In addition, pipes or tubing are commonly used to form roll cages for the protection of passengers in the event of all-terrain vehicle accidents.

BRIEF SUMMARY OF THE INVENTION

It has become more and more common for all-terrain vehicles, boats, and other forms of transportation to be provided with racks supported above the top of the vehicles that are made of pipes and tubing that will support canopies, lights, or other objects to be transported using the vehicle or craft.

It has been discovered that the towers, formed by pipes provide a very convenient support on which mirrors can be attached to facilitate viewing by an operator of activities taking place behind the vehicle or craft. Such mirrors facilitate observation of trailers, following behind off-highway vehicles, or water skiers, or wake board riders, tube riders, or others being towed behind a water craft.

Mirrors used on off-road vehicles and watercraft are subject to significant vibration. Consequently, mirrors used with such vehicles and craft must have some means of dampening the vibration to the mirrors and securing the mirrors so that they do not become loosened, fall off and damaged by virtue of the vibrations. In addition, mirrors securely mounted on off-road vehicles and water craft, must be readily adjustable to provide proper viewing and must yield, without breaking, when subjected to contact with other vehicles, water craft or other solid objects such as docking structure or tree limbs.

OBJECTS OF THE PRESENT INVENTION

It is an object of the invention to provide a durable, multi-adjustable mirror and mirror attachment bracket assembly that can be easily secured in a desired location on pipe or tubing supporting or forming a tower or rack of an off-highway vehicle, water craft, or other craft.

Other objects are: to provide a mirror and mirror attachment bracket including a strap-on clamp to secure the assembly at a desired location and orientation on a support pipe or on tubing forming support columns for an overhead framework; to provide a connector assembly interconnecting the clamp and an arm of a mirror, the connector assembly including mirror adjustment means to permit selective positioning of the mirror around the support column or support member; to provide a mirror support arm including a vibration dampener; and a locking structure to immobilize the mirror arm; and to provide an adjustable spring biasing assembly that will allow selection of the pressure required to permit the mirror to yield when positioned for proper reverse viewing, or on impact and to swing, either forwardly or reversely, around the support column or support member to which the arm is attached.

FEATURES OF THE INVENTION

Principal features of the invention include a column mounting bracket that is particularly suitable for use with tubular columns; a support base projecting from the column mounting bracket; a mirror support arm having one end mounted for rotation on the support base; and a mirror having an eccentric, universal ball and socket mounting on the back surface thereof. The eccentric mounting is turned onto a threaded extension of the free end of the mirror support arm; a locking nut secures the mirror to a selected extended rotational position relative to the axis of the mirror support arm; and a vibration dampener is secured in the mirror support arm extension.

Additional objects and features of the invention will become apparent from the following drawings and detailed description.

BRIEF DESCRIPTION OF THE FIGURES OF THE INVENTION

In the Drawings

Figure 2:
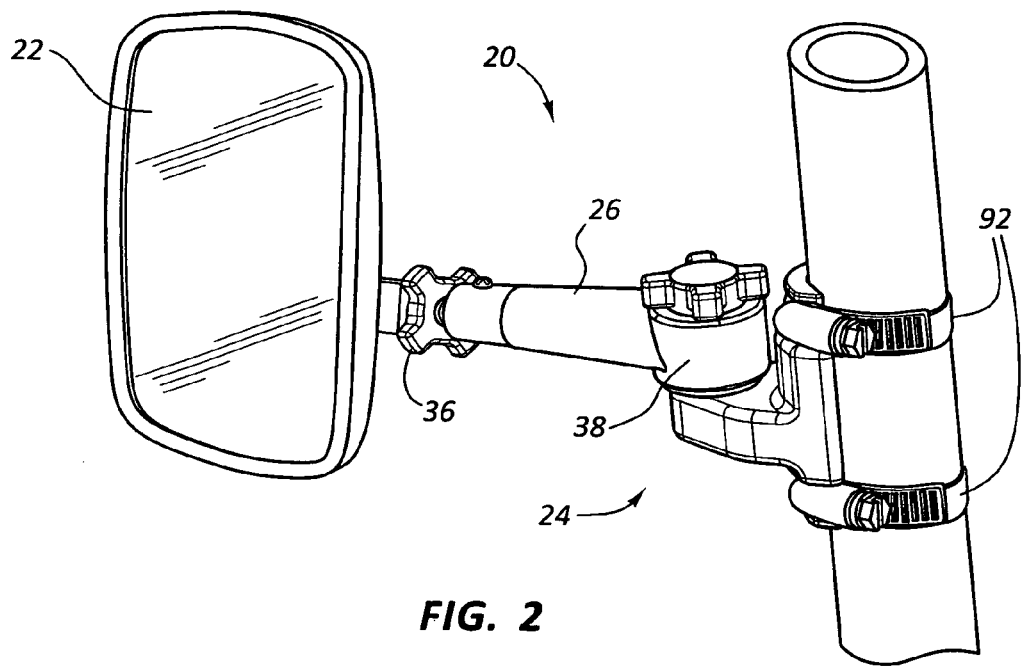
Figure 3:
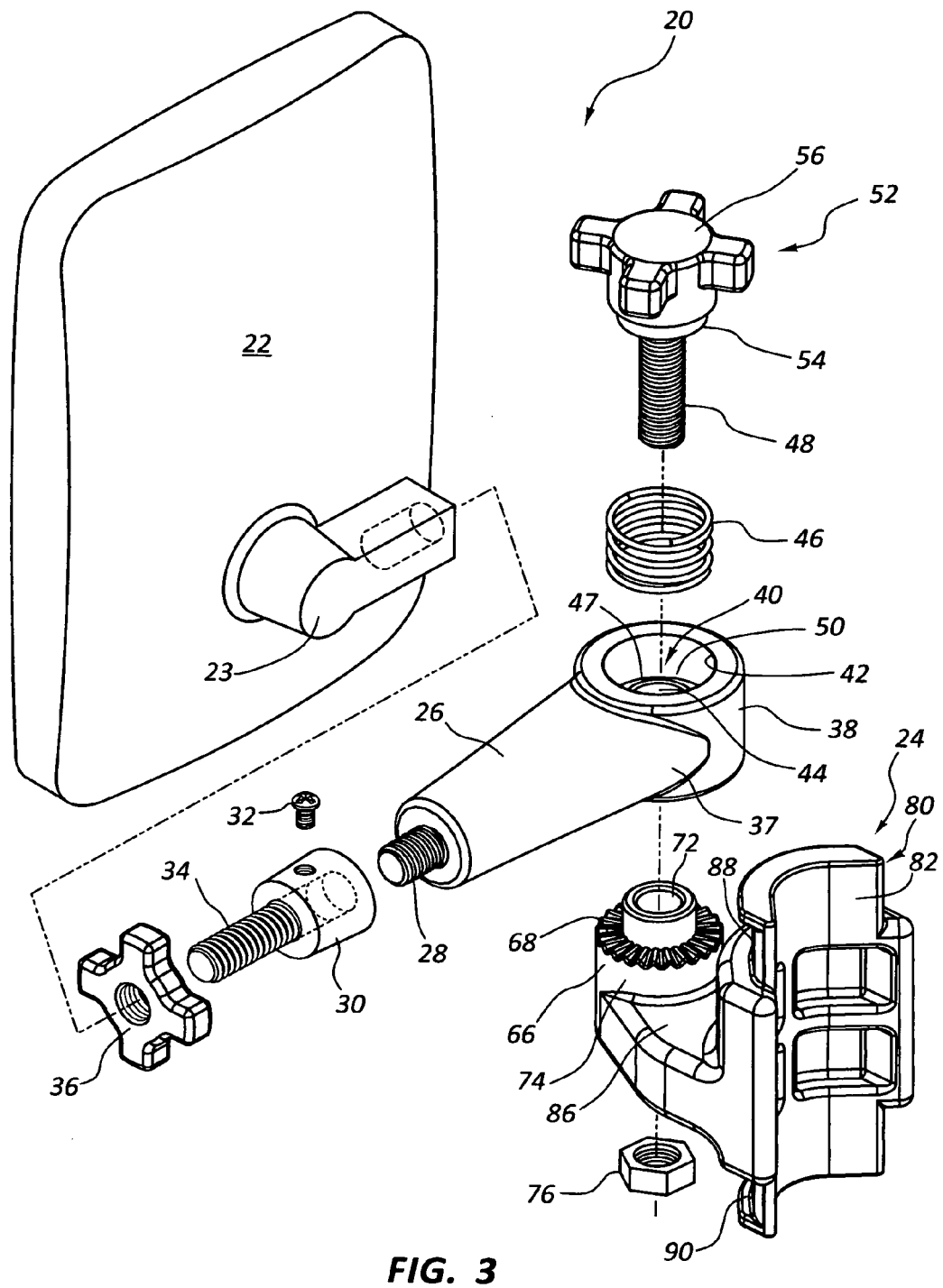
Figure 4:
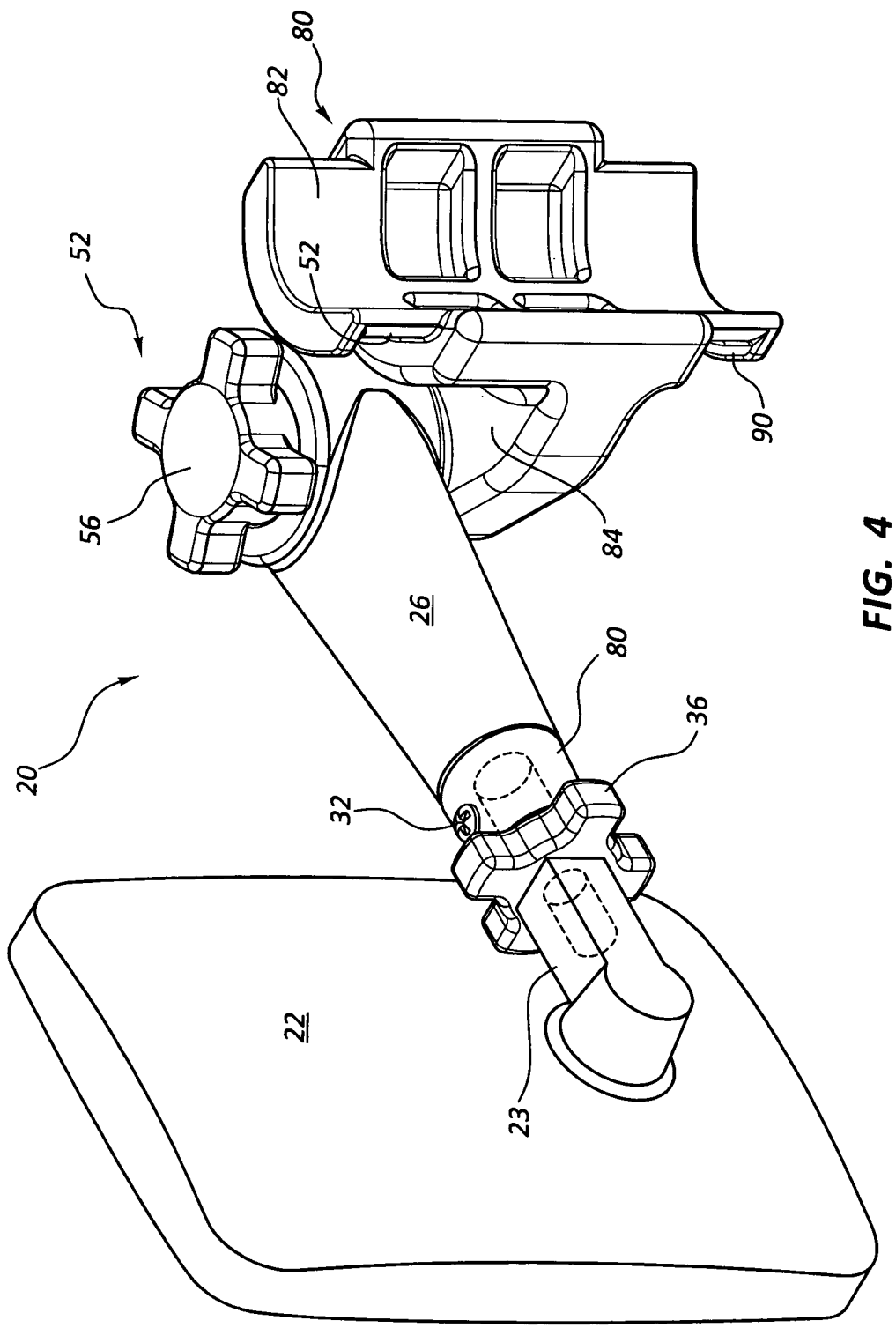
Figure 5:
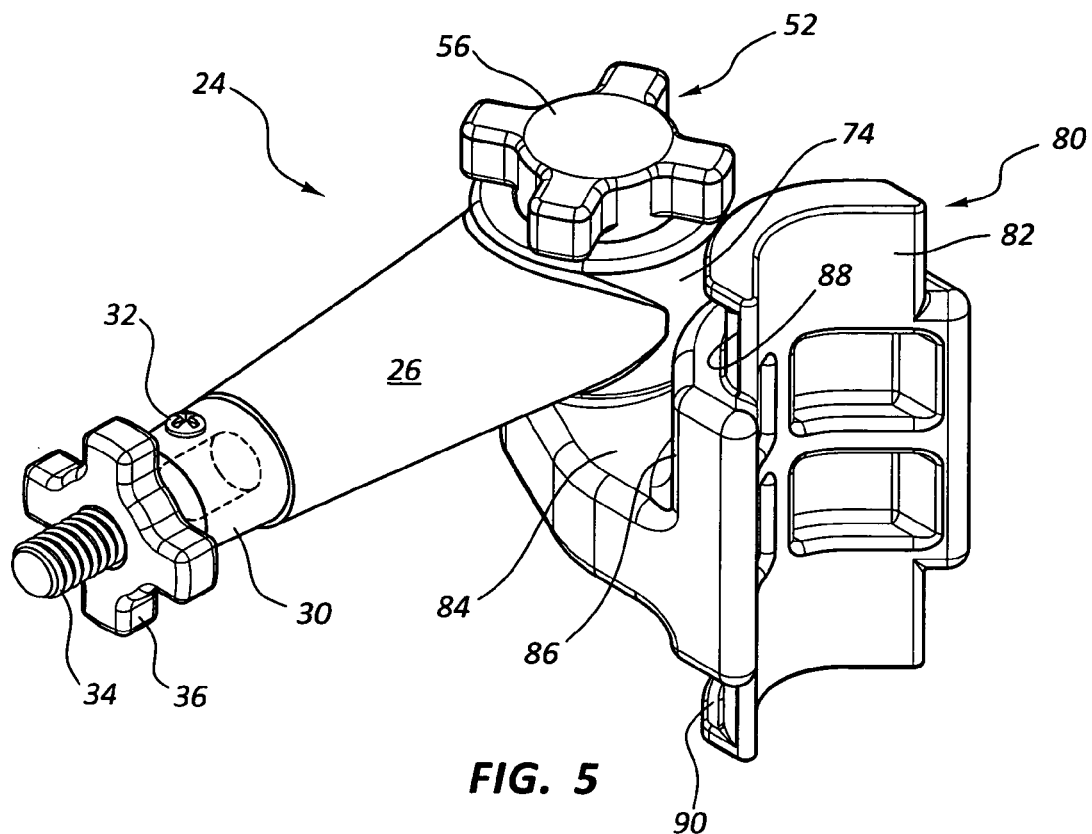
Figure 6:
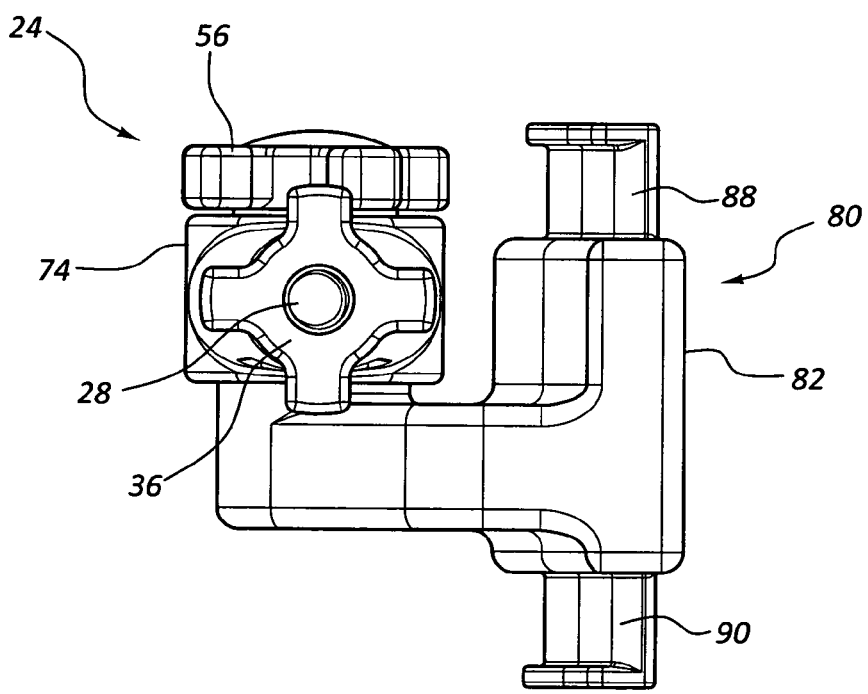
Figure 7:
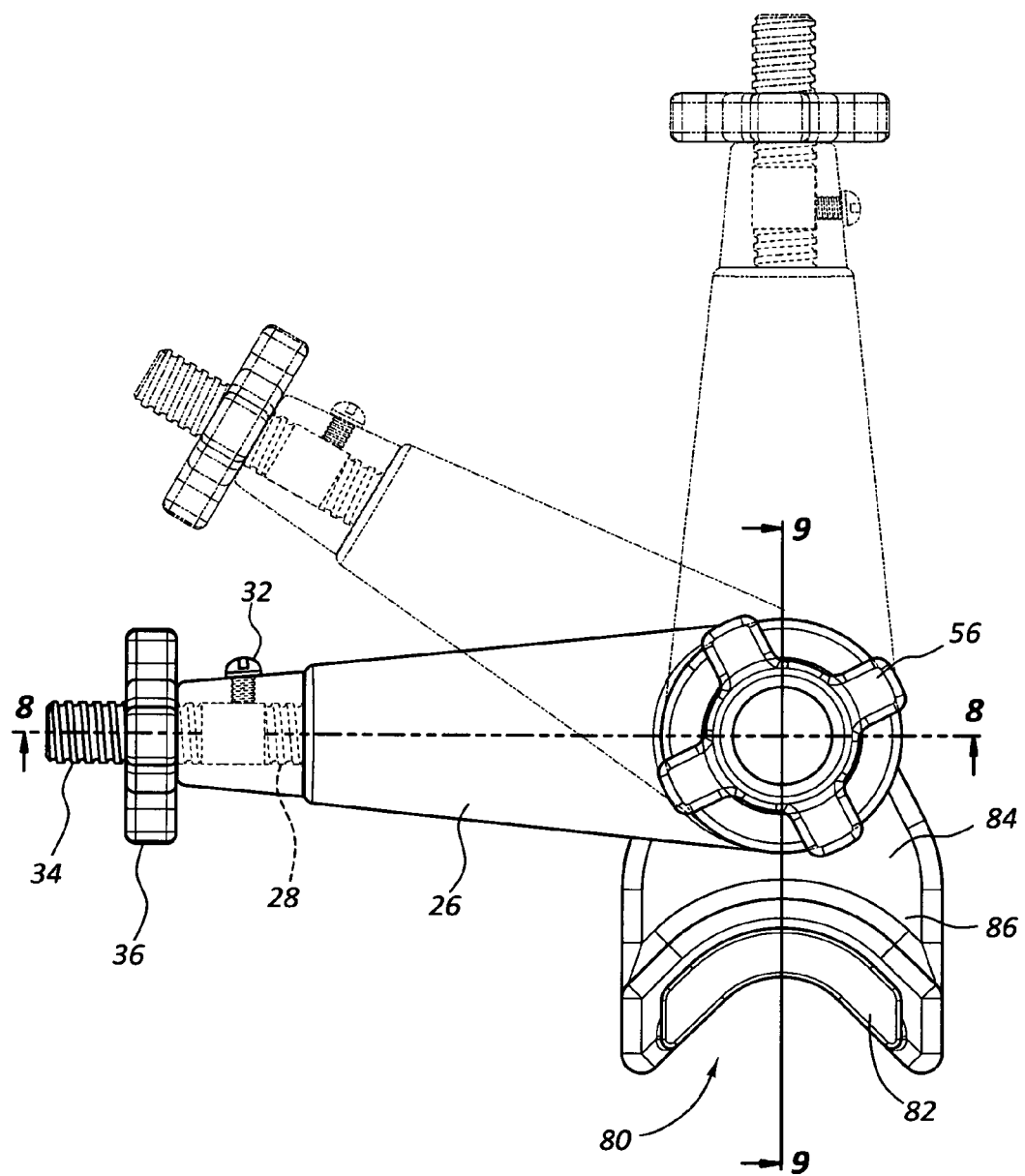
Figure 8:
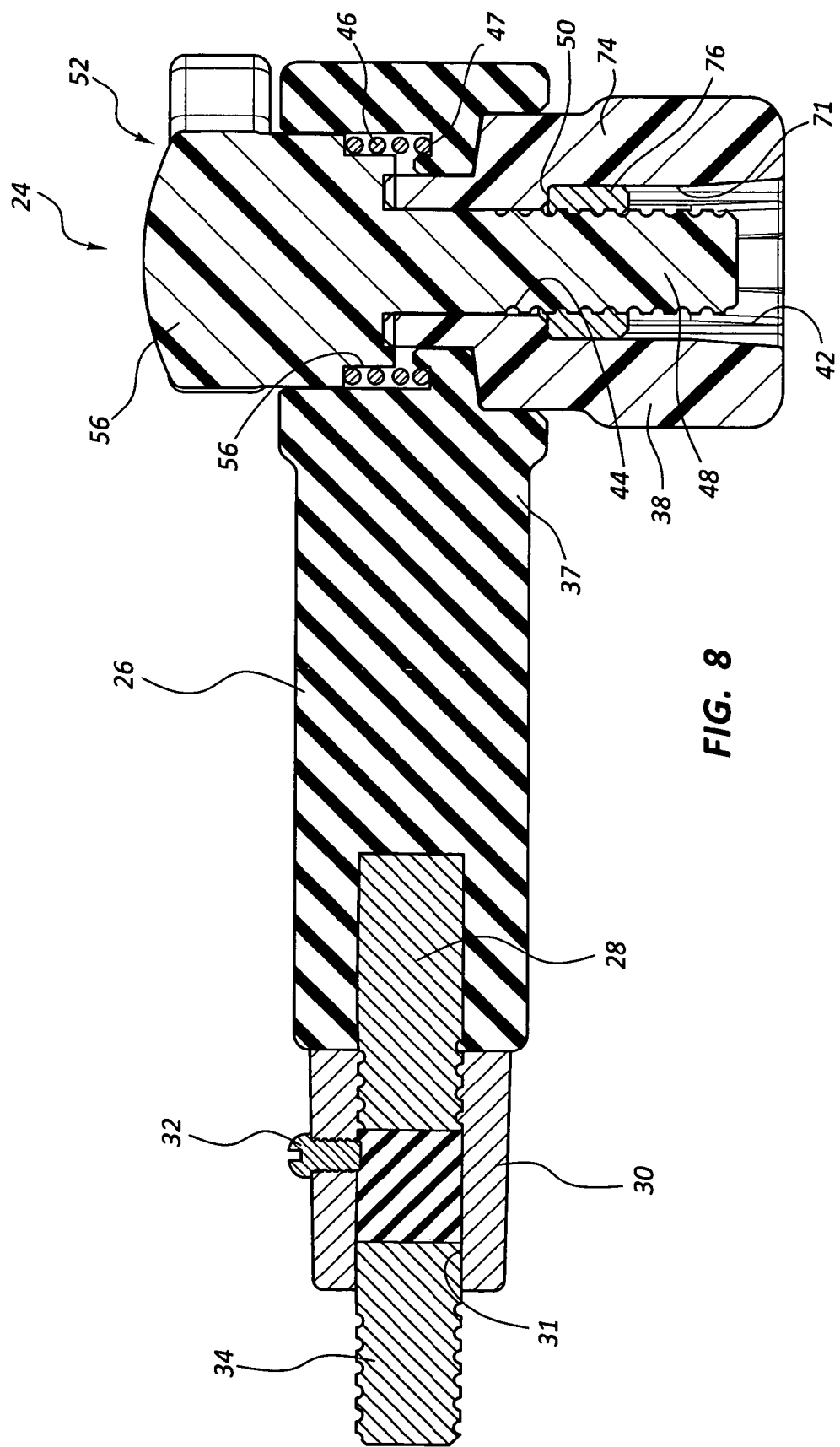
Figure 11:
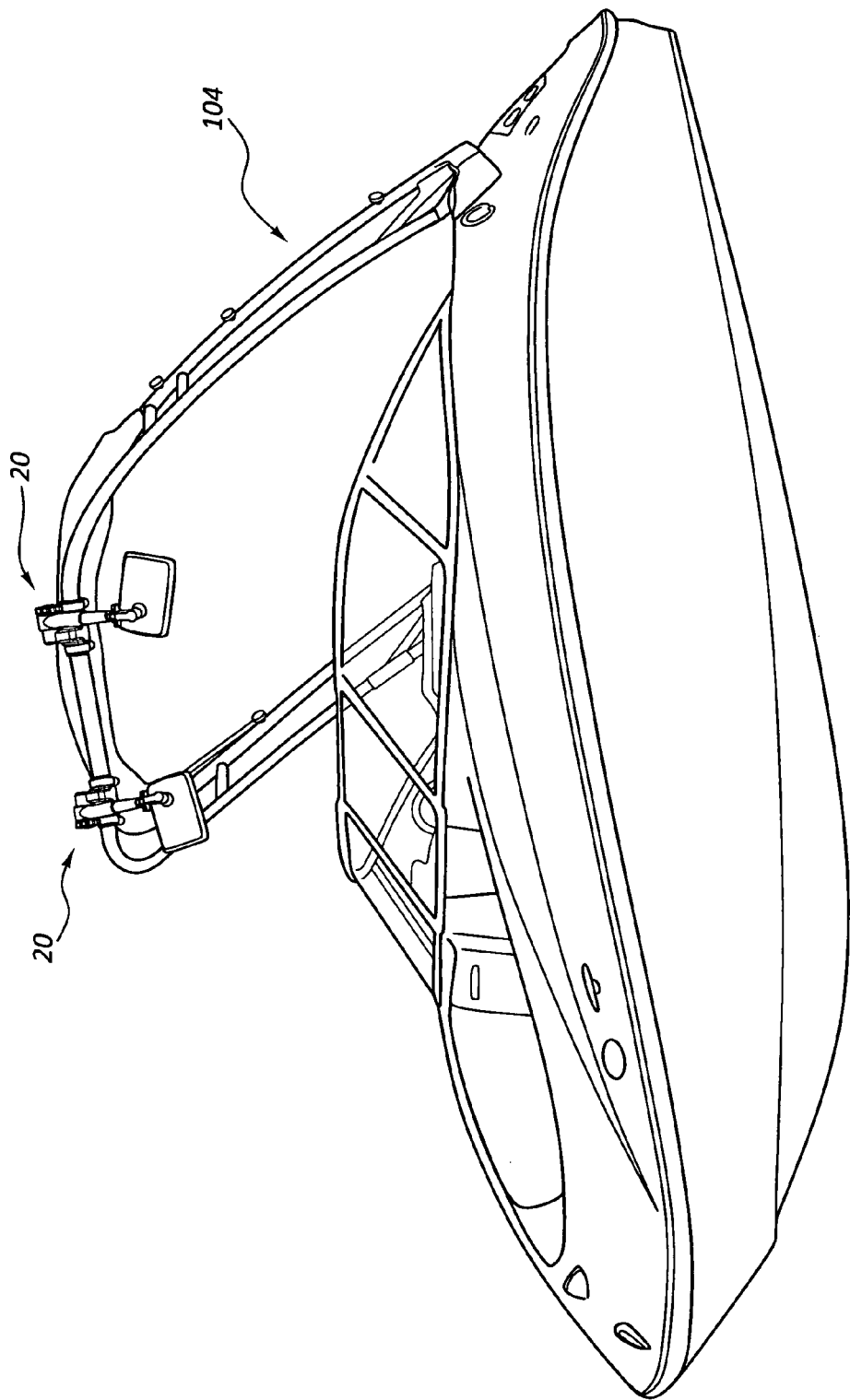

FIG. 1 is a pictorial view of an off-highway vehicle, having a pair of pipe mountable mirrors with brackets attached thereto;

FIG. 2, a perspective view of the pipe mountable mirror with bracket of the invention attached to a pipe (shown fragmentarily);

FIG. 3, an exploded view of the mirror with bracket;

FIG. 4, a perspective view of the mirror with bracket, taken from behind the mirror;

FIG. 5, a perspective view of the bracket with the mirror removed;

FIG. 6, a perspective view of the bracket, as viewed from the end of the mirror support arm, positioned as shown in FIG. 5;

FIG. 7, a plan view of one end of the bracket and showing rotation of the mirror support arm;

FIG. 8, an enlarged section view taken on the line 8-8 of FIG. 7;

FIG. 9, a section taken on the line 9-9 of FIG. 7;

FIG. 10A, 10B, 10C, pictorial views of meshing teeth of the rings of teeth, and showing how the teeth slide over one another; and FIG. 11, a pictorial view of the mirror with bracket attached to an overhead pipe support of a boat.

| COMPONENT NUMBERS USED ON THE DRAWINGS | |
|---|---|
| Reference Numbers | Components |
| 20 | mirror with bracket component, generally. |
| 22 | mirror. |
| 23 | coupling on rear at mirror 22. |
| 24 | mounting assembly generally. |
| 26 | mirror support arm of column mounting assembly 24. |
| 28 | threaded shaft projecting from end of arm 26. |
| 30 | sleeve threaded onto shaft 28. |
| 31 | resilient dampener in sleeve 30. |
| 32 | set screw to secure dampener 31. |
| 34 | threaded shaft projecting from end of sleeve 30. |
| 36 | finger tightened nut on shaft end 28. |
| 37 | opposite end of mirror support arm 26. |
| 38 | cylindrical housing at opposite end of arm 26. |
| 40 | counter bore through housing 38. |
| 42 | larger diameter bore of counter bore 40. |
| 44 | small diameter bore of counter bore 40. |
| 46 | coiled compression spring fits in larger bore 42. |
| 47 | groove in shoulder 50. |
| 48 | threaded shaft of bolt 52. |
| 50 | shoulder between counter bores 42 and 44. |
| 52 | bolt inserted through spring 46. |
| 54 | circular shoulder beneath head of bolt 52. |
| 56 | head of bolt 52. |
| 60 | first ring of teeth on shoulder 50. |
| 62 | teeth of ring 60. |
| 66 | second ring of teeth on circular base support 70. |
| 68 | teeth of ring 66. |
| 70 | circular base support encircled by ring 66 of teeth 68. |
| 72 | bore 72 through base 74. |
| 74 | base on which second ring of teeth 66 is formed. |
| 76 | nut in bore 72. |
| 80 | partial sleeve of column mounting bracket assembly 24. |
| 82 | curved inner surface of partial sleeve 80. |
| 84 | base support arm projecting from partial sleeve 80. |
| 86 | curved outer surface of partial sleeve 80. |
| 88 | groove for clamping strap 92. |
| 90 | groove for clamping strap 92. |
| 92 | conventional clamping straps to be placed around grooves 88 and 90. |
| 94 | upright tubular supports of rack 96. |
| 96 | rack on all-terrain vehicle 98. |
| 98 | all-terrain vehicle. |
| 100 | horizontal tubular support member of overhead rack 102. |
| 102 | overhead rack of boat 104. |
| 104 | boat. |

DETAILED DESCRIPTION

Referring now to the Drawings:

In the illustrated preferred embodiment the pipe mountable mirror with bracket, shown generally at 20, includes a mirror 22, a mirror support arm 24 and a column mounting bracket assembly 24.

A mirror support arm 26 of the column mounting assembly 24 has a threaded shaft 28 formed in and projecting therefrom. Sleeve 30 is threaded onto shaft 28 until shaft 28 engages a resilient dampener positioned in sleeve 30 and held in place by arms 32 and into engagement with a resilient threaded damper 31 that is secured in the sleeve by set screws 32 to one end 34 of the shaft 28. A finger tightened nut 36 is turned onto the one end of threaded shaft 24. Mirror 22 has an interiorly threaded coupling 23 fixed to the back thereof. When assembled, the coupling is threaded onto the end of shaft 34 and finger nut 36 is turned onto end 28 of shaft 34 to engage and secure coupling 23 to hold the mirror in a selected extended and rotational position. The opposite end 37 of the mirror support arm 26 has a cylindrical housing 38, with a counter bore 40 extending there through. The common axis of the counter bore 40 passes through the cylindrical housing 38, transverse to the axis of the mirror support arm 26. One end of the counter bore 40 has a larger diameter bore 42 and the bore 44 at the other end of the counter bore has a smaller diameter. A coiled compression spring 46 has one end inserted into a groove 47 in the shoulder 50 formed between the larger diameter and smaller diameter counter bores 42 and 44. A threaded end of shaft 48 of a bolt 52 is inserted through the coils of the spring 46 and through the smaller diameter bore 44. A circular shoulder 54, formed beneath the head 56 of bolt 52, fits into the other end of spring 46.

A first ring 60 of radially extending teeth 62 is formed in the larger diameter bore 42 and on the shoulder 50. A second ring 66 of radially extending teeth 68 is formed on the end of cylinder 70 that projects from and that has a common central axis with the first ring 60 of teeth 62 and has a bore 72 extending through a base 74. Turning of head 56 of bolt 52 threads the bolt into or out of a nut 76 that is fitted into bore 72 and that is held against rotation as the threaded shaft 48 is turned. Threading bolt 52 into or out of the nut 76 compresses or relaxes spring 46 and moves the teeth of ring 60 into more firm, or less firm, engagement with the teeth 68 of ring 66. Thus, turning of bolt 52 determines the pressure applied to spring 46 and the amount of force application necessary to move the inclined faces of teeth 62 over the inclined faces of teeth 68, in either a forward or reverse direction and to swing the mirror support arm 26.

The column mounting assembly includes an elongate partial sleeve 80, with a curved inner surface 82 that will fit against a tubular column or support member, as will be further explained. A base support arm 84 projects centrally from a curved outer surface 86 of the partial sleeve 80. A pair of grooves 88 and 90, respectively closely spaced from opposite ends of the base support arm 84 accommodate conventional clamping straps 92 that extend around a column or other support member and that are tightened to secure the column mounting assembly in place on such column or other support member.

The cylinder 70 is formed on the base support arm 84 and has the second ring 66 of teeth 68 formed therearound. The ring 66 of teeth 68 surrounds cylinder 70 and is formed on the base 74. Base 74 extends from base support arm 84 and has the bore 72 therethrough bore 42, larger than the bore 94, is axially aligned with bore 94 and has a length 98 that extends through the base support arm 84. Pairs of slots 102 formed in the wall of length 98 receive the outside corners 104 of the nut 76 as the nut is positioned in the larger bore 98. The nut 106 is thus secured against rotation within the length 98 of bore 42, as the bolt 52 is threaded into and out of the nut.

As shown best in FIG. 11, when the teeth 62 and 66 are fully meshed together, the engaging surfaces of the teeth 62 and 68 are inclined and the apexes of the teeth 60 engage the base of the teeth 66 and the apexes of the teeth 66 engage the base of the teeth 62. Spring 46 resiliently biases the teeth 62 into meshing engagement with teeth 66. The teeth 62 and 66 are formed of a durable material having good lubricating properties, so that the movable teeth 62 will slide up over the apexes and down the fixed teeth 66, whether the ring 60 is turned in a forward or backward direction with respect to the ring 64.

Teeth 62 are rotated with arm 26 during positioning of mirror 22 and in response to driving impact on the mirror 22 or arm 33 and are biased by spring 46 into engagement with teeth 66 and the biasing force depends on the extent to which bolt 52 is turned into nut 76. The mirror arm 26 and mirror 22 are also held in a fixed position when the bolt 52 is fully turned into nut 76.

As shown best in FIG. 1, the pipe mountable mirrors with brackets 20 will clamp onto pipe columns forming upright tubular supports 94 of a rack 96 of a craft such as an all-terrain vehicle 98. Similarly, the pipe mountable mirrors with brackets 20 will clamp to a horizontal tubular support member 100 of a overhead support rack of a craft such as the boat 104 (FIG. 10).

Although a preferred embodiment of our invention has been herein described, it is to be understood that the present disclosure is by way of example and that variations are possible without departing from the subject matter coming within the scope of the following claims, which subject matter we regard as our invention.

We claim:

1. A pipe mountable mirror with bracket comprising
   a pipe mounting assembly for engaging a pipe;
      clamping means to secure said pipe mounting assembly to a pipe;
      a base support arm projecting from said pipe mounting assembly;
      a fixed first ring of teeth supported on said base support arm;
      a bore through said first fixed ring of teeth;
      a mirror support arm;
      a mirror secured to one end of said mirror support arm;
      a housing fixed to an opposite end of said mirror support arm, said housing having a bore there through;
      a second ring of teeth in said bore through said housing, with the inclined faces of teeth of said first ring of teeth in face-to-face engagement with inclined faces of teeth of said second ring of teeth; and
      means adjustably and resiliently biasing said second ring of teeth into face to face meshing engagement with said fixed first ring of teeth whereby force require to rotate said mirror support arm forward or backward around said bore is varied.

2. A pipe mountable mirror with bracket as in claim 1, further including
   a resilient shock dampener positioned intermediate the length of the mirror support arm.

3. A pipe mountable mirror with bracket as in claim 2, wherein
   the shock dampener is a resilient member secured against rotation in a sleeve threaded onto bolts at opposite ends of said sleeve, said bolts engaging said resilient member and projecting from spaced apart portions of said mirror support arm.

4. A pipe mountable mirror with bracket as in claim 2, wherein the pipe mounting assembly includes:
   a partial sleeve with spaced inner and outer curved surfaces extending the length of the partial sleeve whereby said partial sleeve will partially encircle a pipe.

5. A pipe mountable mirror with bracket as in claim 1, where the pipe housing includes:
   a partial sleeve with spaced inner and outer curved surfaces extending the length of the partial sleeve whereby said partial sleeve will partially encircle a pipe.

6. A pipe mountable mirror with bracket as in claim 1, wherein
   the means biasing said second ring of teeth into meshing engagement with said first ring of teeth comprises a coil spring.

7. A pipe mountable mirror with bracket as in claim 2, wherein:
   the means biasing said second ring of teeth into meshing engagement with said first ring of teeth comprises a coil spring.

8. A pipe mountable mirror with bracket as in claim 3, wherein:
   the means biasing said second ring of teeth into meshing engagement with said first ring of teeth comprises a coil spring.

9. A pipe mountable mirror with bracket as in claim 5, wherein;
   the means biasing said second ring of teeth into meshing engagement with said first ring of teeth comprises a coil spring.

10. A pipe mountable mirror with bracket comprising:
   a pipe mounting assembly including an elongate partial sleeve with spaced inner and outer curved surfaces extending the length of the partial sleeve whereby said partial sleeve will partially encircle a pipe;
   clamping means to encircle and secure said inner curved surface of said elongate partial sleeve to a pipe, or tube of a rear to a motorized craft;
   a base support arm fixed to and projecting from said outer wall of said outer curved surface and having a flat top surface;
   an upstanding circular base formed on said flat surface;
   a circular support extending from said circular base;
   a fixed first ring of teeth, with the teeth of said first ring of teeth each having opposed inclined front and rear faces formed on said circular base and surrounding said circular support;
   a first bore through said circular support;
   a second larger bore axially aligned with said bore through said circular support and extending through said circular base and said base support arm;
   a nut positioned in said second larger bore;
   an elongate mirror support arm having a threaded shaft projecting from one end thereof;
   a cylindrical housing on an opposite end of said mirror support arm, said housing having a counter bore there through with a large counter bore extending through one end of said housing to a shoulder in said housing and a smaller counter bore extending from an opposite end of said housing to said shoulder;
   an encircling groove in said shoulder at the end of the large counter bore;
   a second ring of teeth shaped like said teeth of said first ring of teeth, formed on the opposite side of said shoulder in said smaller counter bore and meshing in face to face engagement with said teeth of said first ring of teeth during forward and reverse rotation of said second ring of teeth and sliding movement of an apex of each tooth of said second ring of teeth over the apex of each tooth of said fixed ring of teeth;
   a coil spring in said larger counter bore and having one end fitted into said groove;
   a nut in said smaller bore and means to prevent rotation of said nut in said bore;
   a bolt having a head, a threaded bolt shaft and a shoulder between said head and said threaded bolt shaft, said shoulder fitted into the other end of said coiled spring and said threaded bolt shaft extending through said coiled spring and threaded onto said nut;
   a sleeve threaded onto and projecting from said first threaded shaft projecting from said one end of said mirror support arm;

a resilient shock absorber in said sleeve and engaging said first threaded shaft.

11. A variable pressure applicator for support structures to be rotated in response to impact forces, comprising:

a base support arm;

a fixed first ring of teeth each having inclined front and rear faces terminating in an apex, and said fixed first ring of teeth being mounted on said fixed base support arm;

a bore extending centrally through said first fixed ring of teeth;

a rotatable arm having means on one end for connection to a structure to be rotated forward or rearward around said bore extending centrally through said first ring of teeth;

a second ring of teeth, with each tooth of said second ring of teeth having inclined front and rear faces terminating at an apex and said teeth of said second ring of teeth being in face to face engagement with said teeth of said first fixed ring of teeth;

a coil spring fixed between said base support arm and said rotatable arm, said spring acting to bias said second ring of teeth out of mesh with said first ring of teeth; and means for adjustably compressing said spring to selectively vary the force required to move the teeth of the second ring of teeth over the apexes of the teeth of the first ring of teeth.

* * * * *